United States Patent Office 3,298,908
Patented Jan. 17, 1967

3,298,908
N-HYDROXYMETHYL-2,3,6-TRICHLOROPHENYL-ACETAMIDE AS A FUNGICIDE
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Jan. 6, 1964, Ser. No. 336,058
2 Claims. (Cl. 167—30)

This application is a continuation-in-part of United States patent application Serial No. 99,720, filed March 31, 1961, now United States Patent 3,147,306.

This invention describes N-hydroxymethyl-2,3,6-trichlorophenylacetamide, which is a new composition of matter useful as a fungicide active against various plant pathogens.

There is a serious need for fungicides effective against Alternaria and Monolinia species. The various species of Alternaria fungi are responsible for many serious crop diseases, amongst which are early blight of tomatoes, leaf spot of soybeans, leaf spot of carrots, leaf blight of muskmelons, leaf spot and canker of carnations and other ornamentals, and leaf spot of cotton.

Another fungus responsible for major economic loss is *Monolinia fructicola*, the causative organism of brown rot of peach, plums, apricots, and cherries.

It is an object of our invention to make available a new and effective fungicidal compound having activity against many important fungi. It is a further object to make available new fungicidal compounds of particular effectiveness on Alternaria and Monolinia fungi. It is a further object to make available new fungicidal compounds to protect fruits and vegetables from fungus attack.

We have now found that N-hydroxymethyl-2,3,6-trichlorophenylacetamide, a new composition of matter, is highly effective against fungi, and particularly against Alternaria and Monolinia species, said compound and compositions thereof being effective against crop diseases caused by these and other fungi.

The new compound of the invention is prepared by treating the known 2,3,6-trichlorobenzyl chloride with an alkali cyanide to make 2,3,6 - trichlorobenzyl cyanide, which is then hydrolyzed by sulfuric acid to 2,3,6-trichlorophenylacetamide. This amide is then treated with formaldehyde in the presence of a strong base to produce the N-hydroxymethyl-2,3,6 - trichlorophenylacetamide, a crystalline colorless solid.

It is surprising and unexpected that this new compound would have such activity. The intermediate 2,3,6-trichlorophenylacetamide from which the compound is derived is totally lacking in activity against Alternaria and Monolinia fungi as are N-methyl-2,3,6-trichlorophenylacetamide and other N-substituted analogs, as well as isomers having the ring chlorine atoms in other positions. The corresponding acid is excessively phytotoxic as well as substantially non-fungicidal.

Various application techniques can be employed for treating the fruit or vegetable crops with the novel fungicidal compound of this invention. For example, the fungicidal compound may be mixed with an inert carrier and applied either as a dust or spray. The compound may be used by itself in a state of purity ranging from the crystalline to the technical crude. Alternatively, the fungicidal compound may be formulated in preparations and mixtures ranging from the very simple to the complex. Such formulations or compositions facilitate handling and application and sometimes enhance fungicidal effectiveness. This novel fungicide may be formulated by mixing it with conventional adjuvants, modifiers, diluents or conditioning agents, hereinafter called inert carriers, to provide compositions in the form of solutions, emulsions, dispersions, powders wettable or dispersable in water or other solvents, dusts, granules or pellets. Thus, it lends itself to use with a carrier or diluent agent such as a finely divided solid, a solvent liquid or organic origin, water, a surface active agent, or aqueous emulsion or any suitable combination of one or more of any of these.

When the fungicidal composition of this invention is to be made up as a liquid composition, water, xylene, kerosene, alcohols, ketones, glycols and other liquids may be used as solvents, diluents or as a dispersing media. These liquid compositions whether solutions or dispersion of the active fungicide in a liquid solvent may contain one or more surface active agents in amounts sufficient to render the composition readily dispersible in water. By the term surface active agent is meant wetting agents, dispersing agents, emulsifying agents and the like. A list of typical adjuvants and agents appear in "Soap and Chemical Specialties," vol. 31, No. 7, pages 50 to 61; No. 8, pages 48 to 61; No. 9, pages 52 to 67 and No. 10, pages 38 to 67 (1955).

When the fungicidal composition of this invention is to be made up as a solid formulation, it may be prepared by diluting or dispersing or mixing the active compound with inert solid carriers such as clay, talc, flours, diatomaceous earth, sawdust, the alkaline earth carbonates, phosphates and the like.

Similarly, this composition may be combined with fertilizers such as urea and ammonium nitrate and potash, other fungicides such as sulfur, biphenyl, the metal dimethyldithiocarbamates and metal ethylene bis-(dithiocarbamates) or with insecticides exemplified by benzene hexachloride and chlordane or DDT.

In the case of application to crops, the distribution of an effective or fungicidal dosage of the compound of this invention is essential to the practice of this invention. While such variables as climatic conditions, soil structure, the fungus to be treated and the plant affected, make a precise statement of rate of application meaningless, in general good results are obtained through the use of a concentration of from ten to one thousand parts of active ingredient to one million parts of inert liquid or solid carrier. Higher concentrations than one thousand parts per million of active ingredient become economically unfeasible. The preparation of the novel composition as well as more detailed illustration of the workings of this invention appear in the examples which follow.

*Example 1.—Preparation of N-hydroxymethyl-2,3,6-trichlorophenylacetamide*

A quantity of 2,3,6-trichlorotoluene prepared as suggested by Brimelow et al. in J. Chem. Soc., 1208 (1951), is placed in a standard chlorination vessel and elemental chlorine is introduced into the chlorotoluene under the influence of a two hundred and fifty watt mercury lamp to produce side chain chlorination while the reaction mixture is maintained at a temperature between about ninety degrees and about one hundred and thirty degrees centigrade. When about seventy to eighty mole percent of the amount of chlorine theoretically necessary to produce monochlorination in the side chain has been introduced, the passage of chlorine is interrupted, and the reaction product is fractionated to recover the 2,3,6-trichlorobenzyl chloride so produced.

To a solution of 37.5 parts of sodium cyanide in forty parts of water and one hundred and fifty parts of ethyl alcohol at reflux was added slowly one hundred and thirty-eight parts of 2,3,6-trichlorobenzyl chloride. After refluxing for four and one-half hours, the mixture was filtered, evaporated to remove the alcohol, and the residual solids recrystallized several times from aqueous methanol. The product was a colorless crystalline solid melting at 58.9 degrees centigrade, and identified as 2,3,6-trichlorobenzyl cyanide. The yield under the above described conditions was seventy percent.

The cyanide was added to five parts by weight of technical concentrated sulfuric acid at ninety to one hundred degrees centigrade, and the solution held at this temperature for ten minutes, then poured into water. The precipitated amide was filtered out, washed with water, and dried to obtain a nearly quantitative yield of 2,3,6-trichlorophenylacetamide, melting point one hundred and ninety-two to one hundred and ninety-three degrees centigrade.

A mixture of seven parts by weight of 2,3,6-trichlorophenylacetamide, fifty-five parts of aqueous thirty-six percent formaldehyde, forty-five parts of ethanol, and one part of potassium carbonate was heated two hours at ninety to one hundred degrees centigrade, and cooled. The crystals were filtered out, and recrystallized from ethanol to obtain in good yield, a colorless crystalline solid melting point 154.5 to 155.3 degrees centigrade. Infrared examination confirmed the assigned structure.

*Analysis.*—Calcd. for $C_9H_8O_2NCl_3$: N, 5.2. Found: N, 5.2.

*Example 2.—Preparation of a wettable powder formulation*

The following ingredients are blended:

| | Parts by weight |
|---|---|
| N-hydroxymethyl - 2,3,6-trichlorophenylacetamide | 50 |
| Lignin sulfonate dispersing agent | 10 |
| Sodium alkylnaphthalenesulfonate (wetting agent) | 2 |
| Clay | 38 |

The above mixture is ground in a hammer mill to a particle size finer than three hundred mesh.

*Example 3*

The effectiveness of the compound of the invention and several related compounds was investigated by use of the standard glass slide germination test of the American Phytopathological Society using *Alternaria oleracea* as infective organism.

| Compound | Inhibition of Germination at— | | |
|---|---|---|---|
| | 0.1% | 0.01% | 0.001% |
| N-hydroxymethyl-2,3,6-trichlorophenylacetamide, percent | 100 | 100 | 19 |
| 2,3,6-trichlorophenylacetamide, percent | 0 | 0 | 0 |
| N-methyl-2,3,6-trichlorophenylacetamide, percent | 0 | 0 | 0 |
| N,N'-ethylenebis-2,3,6-trichlorophenylacetamide, percent | 0 | 0 | 0 |
| Control, percent | 0 | 0 | 0 |

*Example 4*

The test method as in Example 3 was employed, using spores of *Monolinia fructicola*.

| Compound | Inhibition of Germination at— | | |
|---|---|---|---|
| | 1% | 0.1% | 0.01% |
| N-hydroxymethyl-2,3,6-trichlorophenylacetamide, percent | 100 | 65 | 35 |
| 2,3,6-trichlorophenylacetamide, percent | 0 | 0 | 0 |
| N-methyl-2,3,6-trichlorophenylacetamide, percent | 0 | 0 | 0 |
| N,N'-ethylenebis-2,3,6-trichlorophenylacetamide, percent | 0 | 0 | 0 |
| Control, percent | 0 | 0 | 0 |

*Example 5*

Carrots infected with the spores of *Alternaria dauci*, the causative organism of Alternaria blight, are sprayed during the middle of the growing season with one pound per acre of the wettable powder formulation of Example 2. At a time late in the season when the characteristic irregular yellowish-brown spots of Alternaria blight are evident on the untreated plants, which are severely damaged thereby, the treated plants are substantially free of these disease symptoms and bear a normal yield at harvest.

The compounds of this invention may also be employed in the treatment of trees, being particularly useful for combating vascular tree diseases attributed to the action of fungi, such as Dutch Elm disease, Oak Wilt or blight and the like, when applied to the trees or loci to be treated in effective sublethal amounts.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:
1. A method of controlling fungal plant pathogens which comprises applying to plants to be protected an effective amount of N-hydroxymethyl-2,3,6-trichlorophenylacetamide.
2. A method according to claim 1 in which said effective amount is a fungicidal amount applied as a composition which comprises from ten to one thousand parts of fungicide per million parts of diluent.

References Cited by the Examiner

UNITED STATES PATENTS

| 2,479,295 | 8/1949 | Behrens | 260—558 X |
| 2,953,598 | 9/1960 | Clark et al. | 260—558 |
| 2,967,125 | 1/1961 | Carlson | 167—30 |
| 2,971,027 | 2/1961 | Hotten | 260—558 |
| 2,972,563 | 2/1961 | Richter | 167—30 |
| 2,977,212 | 3/1961 | Tischler | 260—58 X |

FOREIGN PATENTS 860,310  2/1961  Great Britain.

OTHER REFERENCES

Corse et al.: Jour. Amer. Chem. Soc., vol. 70, pp. 2837–2843, 1948.

LEWIS GOTTS, *Primary Examiner.*

JULIAN S. LEVITT, *Examiner.*

R. L. HUFF, *Assistant Examiner.*